(12) United States Patent
Beal et al.

(10) Patent No.: US 8,807,054 B2
(45) Date of Patent: Aug. 19, 2014

(54) SYSTEM FOR CONVERTING FUEL MATERIALS

(75) Inventors: Corinne Beal, Voisins le Bretonneux (FR); Laurent Maghdissian, Orsay (FR); Michel Vandycke, Gambais (FR)

(73) Assignee: ALSTOM Technology Ltd, Baden (CH)

( * ) Notice: Subject to any disclaimer, the term of this patent is extended or adjusted under 35 U.S.C. 154(b) by 232 days.

(21) Appl. No.: 13/375,977

(22) PCT Filed: May 27, 2010

(86) PCT No.: PCT/EP2010/057300
§ 371 (c)(1),
(2), (4) Date: Mar. 13, 2012

(87) PCT Pub. No.: WO2010/142533
PCT Pub. Date: Dec. 16, 2010

(65) Prior Publication Data
US 2012/0167808 A1    Jul. 5, 2012

(30) Foreign Application Priority Data

Jun. 12, 2009   (EP) ..................... 09162600

(51) Int. Cl.
*F23G 5/00*   (2006.01)
*F23J 1/02*   (2006.01)
*F23C 10/00*  (2006.01)

(52) U.S. Cl.
CPC .............. *F23C 10/002* (2013.01); *F23J 1/02* (2013.01); *F23J 2700/002* (2013.01); *F23C 10/005* (2013.01); *F23C 2900/99008* (2013.01)
USPC ............................ 110/245; 209/142; 209/659

(58) Field of Classification Search
CPC ...... F23C 10/002; F23C 10/005; F23C 10/10; F23C 10/20; F23C 2900/99008; F23J 1/02; F23J 2700/002; F23G 5/30; Y02E 20/344; B01D 45/08; B01D 45/06

USPC ......... 110/245, 215, 216, 266, 203, 204, 243, 110/244; 209/133, 142, 659
See application file for complete search history.

(56) References Cited

U.S. PATENT DOCUMENTS

| 4,684,375 | A | * | 8/1987 | Morin et al. | ................. 48/197 R |
| 4,969,930 | A | | 11/1990 | Arpalahti | ........................ 48/197 |

(Continued)

FOREIGN PATENT DOCUMENTS

| FR | 2850156 | 7/2004 | ............. F23C 10/10 |
| FR | 2895413 | 6/2007 | ............. C10G 51/04 |
| JP | 2002-102835 | 4/2002 | |

OTHER PUBLICATIONS

EP Application No. 09162600.0; Filing Date: Jun. 12, 2009; European Search Report; Date of Mailing: Dec. 22, 2009; 5 pages.

(Continued)

*Primary Examiner* — Kenneth Rinehart
*Assistant Examiner* — Bao D Nguyen
(74) *Attorney, Agent, or Firm* — Robert D. Crawford

(57) ABSTRACT

The invention is related to a system (1) for converting fuel material comprising: a first reactor (2) in which a fuel material reacts with an oxide material for producing reaction products including fuel particles, ash and oxide particles, a second reactor (3) for oxidizing the oxide particles produced in the first reactor (2), a carbon separator (4) that receives fuel particles, ash and oxide particles produced in the first reactor (2) and suitable for separating the oxide particles and ash from the fuel particles, the carbon separator (4) comprising an outlet path (4c) for the oxide particles and ash exhaust, characterized in that said outlet path (4c) of the carbon separator (4) is connected to an ash separator (10) for separating the ash from the oxide particles.

18 Claims, 2 Drawing Sheets

(56) References Cited

U.S. PATENT DOCUMENTS

| | | | | |
|---|---|---|---|---|
| 5,154,732 A * | 10/1992 | Hakulin et al. | ............... | 48/62 R |
| 6,494,153 B1 | 12/2002 | Lyon | ............... | 110/345 |
| 7,533,620 B2 | 5/2009 | Morin et al. | ............... | 110/233 |
| 2006/0130719 A1* | 6/2006 | Morin et al. | ............... | 110/348 |
| 2008/0193349 A1* | 8/2008 | Morin et al. | ............... | 422/213 |
| 2009/0123346 A1 | 5/2009 | Morin et al. | ............... | 422/142 |
| 2010/0104482 A1 | 4/2010 | Morin et al. | ............... | 422/142 |

OTHER PUBLICATIONS

PCT Application No. PCT/EP2010/057300; Filing Date: May 27, 2010; International Search Report; Date of Mailing: Aug. 3, 2010; 4 pages.

Office Action dated Jul. 2, 2013 from the Japan Patent Office for Application 2012-514413.

* cited by examiner

SYSTEM FOR CONVERTING FUEL MATERIALS

TECHNICAL FIELD

The present invention is related to a system for converting fuel material, such as a boiler, and is more particularly directed to an oxidation-reduction reactor system used in fuel conversion.

BACKGROUND

Chemical looping technology is a promising technology intended to achieve gasification or combustion of solid fuels replacing direct oxygen feed by using an oxygen carrier.

Chemical looping is a process by which combustion or gasification of a carbon-based fuel occurs in two steps. In a first step, the oxygen carrier delivers oxygen in a fuel reactor where the oxygen carrier is reduced by the solid fuel and is then transferred to an air reactor. Fuel particles, ash and reduced oxygen carrier are produced in the fuel reactor. In a second step, the reduced oxygen carrier is oxidized by air in the air reactor. In the chemical looping process, the gas resulting from the combustion or gasification of the fuel in the fuel reactor is then free or nearly free from nitrogen. The oxygen carrier can typically comprise a metal oxide or other oxygen rich compounds.

Most of chemical looping technologies use the fluidized beds technology for the fuel reactor to benefit from the high residence time as well as from the good mixing associated with fluidized beds. Fluidized beds can be bubbling fluidized beds or circulating fluidized beds.

Typical crushed coal that is introduced into conventional systems for converting fuel material has a mean diameter of 2 mm and the top size of the coal can reach 20 mm. The biggest particles that do not end as fly ash have hence to be removed as bottom ash.

The current ratio between fly ash and bottom ash is 60/40 and tends to go down to 40/60. A dedicated bottom ash extraction system has to be designed to remove approximately half of the ash introduced via the fuel material into the system.

Thus, a major challenge is to separate the fuel particles and the ash from the oxygen carrier before sending the oxygen carrier to the air reactor for oxidation and regeneration.

The conventional chemical looping systems for converting fuel material comprise a carbon separator, as mentioned for instance in document FR 2 850 156. The carbon separator, which is also called "carbon stripper", is placed between the air reactor and the fuel reactor.

The conventional chemical looping systems also comprise an ash separator placed at the bottom of the fuel and/or air reactor in order to drain ash from the system. This extraction is typically located at the very bottom of the reactor. Several designs exist with different locations for the extraction hole. The hole can be located in the middle of the grate of the reactor by removing some nozzle which leads to a vertical extraction. The hole can be located on a side wall of the reactor with a lateral extraction with a flow that is controlled by a cone valve.

These systems suffer the shortcoming that the ash separator involves a heavy and complex separator system at the bottom or nearly the bottom of the fuel and/or air reactor.

Moreover, the solids mixture at the bottom of fuel and air reactors typically comprises about 10% ash. If 1 kg/s ash is to be extracted, this would mean that 10 kg/s of the mixture containing 1 kg/s ash will be extracted. Thus, the solid quantity that would be needed to treat is ten times higher than the really needed solid quantity.

SUMMARY

Thus, an object of the present invention is to provide a system for converting fuel material in such a manner as to solve the above-described problems.

The object mentioned above is accomplished by a system for converting fuel material comprising:
- a first reactor in which a fuel material reacts with an oxide material for producing reaction products including fuel particles, ash and oxide particles,
- a second reactor for oxidizing the oxide particles produced in the first reactor,
- a carbon separator that receives fuel particles, ash and oxide particles produced in the first reactor and suitable for separating the oxide particles and ash from the fuel particles, the carbon separator comprising an outlet path for the oxide particles and ash exhaust.

According to the present invention, said outlet path of the carbon separator is connected to an ash separator for separating the ash from the oxide particles.

This specific arrangement provides that starting from a mixture of fuel particles, ash and oxide particles, it is possible to separate theses three compounds from each other in a simple way. The device made of the carbon separator and the ash separator is compact and economic to install.

Thus, oxide particles can be sent to the air reactor to be regenerated. The unburned carbon can be sent back to the fuel reactor for further oxidation and the ash is removed which avoids an ash enrichment in the system that could cause an agglomeration.

Last, this specific arrangement avoids a complex and expensive use of an ash separator at the bottom of the fuel and/or air reactor.

It is to be appreciated that both of the carbon separator and the ash separator are fluidized and that the system comprises means for controlling the fluidization velocity of each separator.

The ash density being higher than the fuel particles density, the fluidization velocity of the ash separator is preferably higher than the fluidization velocity of the carbon separator.

The carbon separator and the ash separator can be adjacent separators via a common side wall.

The carbon separator and the ash separator can be connected by a pipe. In this case, the ash separator can be placed below the carbon separator.

The fuel reactor is advantageously connected to a low efficiency cyclone separator comprising a lower outlet connected to the carbon separator and an upper outlet connected to a high efficiency cyclone separator.

The fuel material is typically coal.
The oxide material is typically metal oxide.

BRIEF DESCRIPTION OF THE DRAWINGS

Other features and advantages of the invention will become apparent from the following description of embodiments of the invention given by way of non-limiting examples only, and with reference to the accompanying drawings, in which.

DETAILED DESCRIPTION

Figure 1:
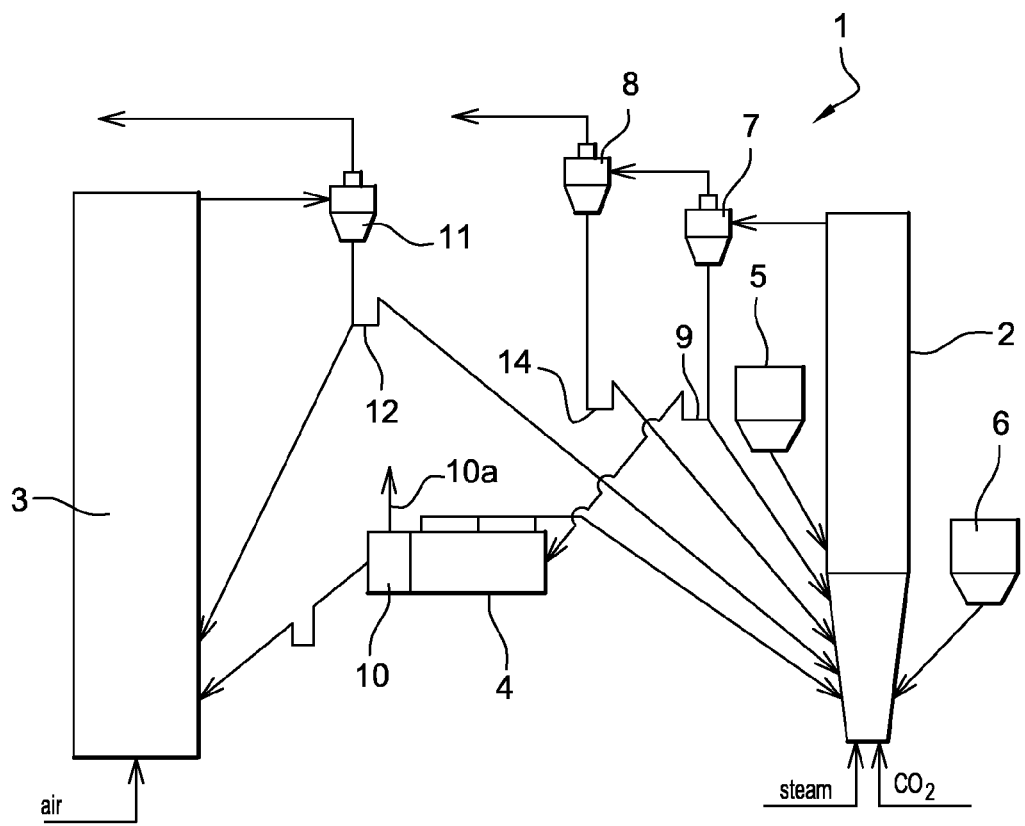
FIG. 1 is a schematic diagram of a system for converting fuel material according to the invention.

As illustrated in FIG. 1, a system 1 for converting fuel material according to the invention, which is intended to produce electricity and/or steam, comprises a fuel reactor 2, an air reactor 3 and a carbon separator 4.

A solid fuel material coming from a fuel silo 5 and a metal oxide coming from an oxide silo 6 enter the fuel reactor 2. The solid fuel material is preferably coal. The metal oxide can be based on iron, nickel, alumina or a mixture thereof.

The fuel reactor 2 is fluidized by steam and/or recycled flue gas and/or carbon dioxide. A first separation device, preferably a low efficiency separation cyclone 7, is fed with combustion gases, ash, fuel particles and oxide particles coming from the fuel reactor 2. The combustion gases comprise mainly $CO_2$ and steam.

The efficiency of a separation device is the ratio of the quantity of particles collected by the device to the quantity of solids at the inlet of the device.

The upper stream of the solids of the low efficiency separation cyclone 7 is circulated into a high separation device, preferably a high efficiency separation cyclone 8. Thus, the solids comprising mainly fine carbon particles are separated from the fly ash and are re-introduced in the fuel reactor 2 via a seal pot 14.

The solids leaving the low efficiency cyclone 7 enter a seal pot 9 from which a first portion is routed into the fuel reactor 2 and from which a second portion is routed into the carbon separator 4. The seal pot 9 can be fluidized by steam and/or recycled flue gas.

The carbon separator 4 separates out the fine and light particles, such as the carbon-containing residue, which are sent to the fuel reactor 2, from the denser and larger oxide particles and ash which are sent to the air reactor 3. According to the invention, the carbon separator 4 is connected to an ash separator 10 that includes a specific vent 10a to allow the ash to escape. The average particle diameter of the fuel material entering the fuel reactor 2 is preferably less than the average particle diameter of the oxide material. More preferably, the average particle diameter of the fuel material is controlled to be at least twice smaller than the average particle diameter of the oxide material. The average particle diameter of the fuel material can be equal to about 50 µm. It can be comprised between 50 and 60 µm.

In this case, the density of the oxide particles is higher than the density of the fuel particles, the density of the ash being comprised between the density of the fuel particles and the density of the oxide particles.

The oxide particles coming from the carbon and ash separator 4,10 are oxidized by air in the air reactor 3. The oxides and the depleted air leaving the air reactor 3 enter a separation device 11, typically a cyclone separator, in which the oxide particles are separated from the gases comprising $N_2$ and $O_2$.

The solid oxide particles extracted from the bottom of the cyclone 11 enter a seal pot 12 from which a first portion is transferred to the bottom of the air reactor 3 and from which a second portion is routed to the bottom of the fuel reactor 2. The seal pot 12 can be fluidized with air.

Figure 2:
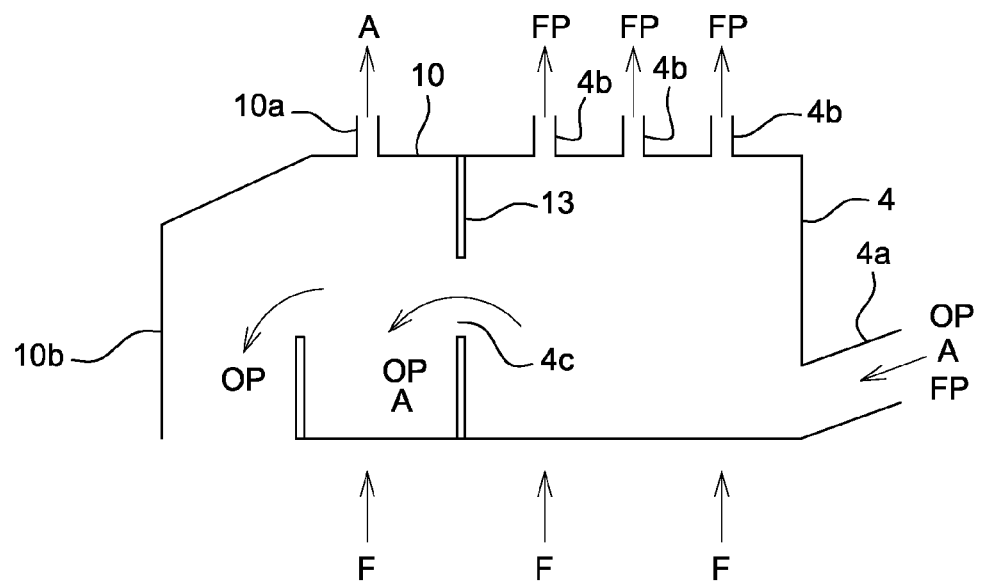
FIG. 2 is a schematic view of a part of the system according to a first embodiment, and FIG. 3 a schematic view of a part of the system according to a second embodiment.
Figure 3:
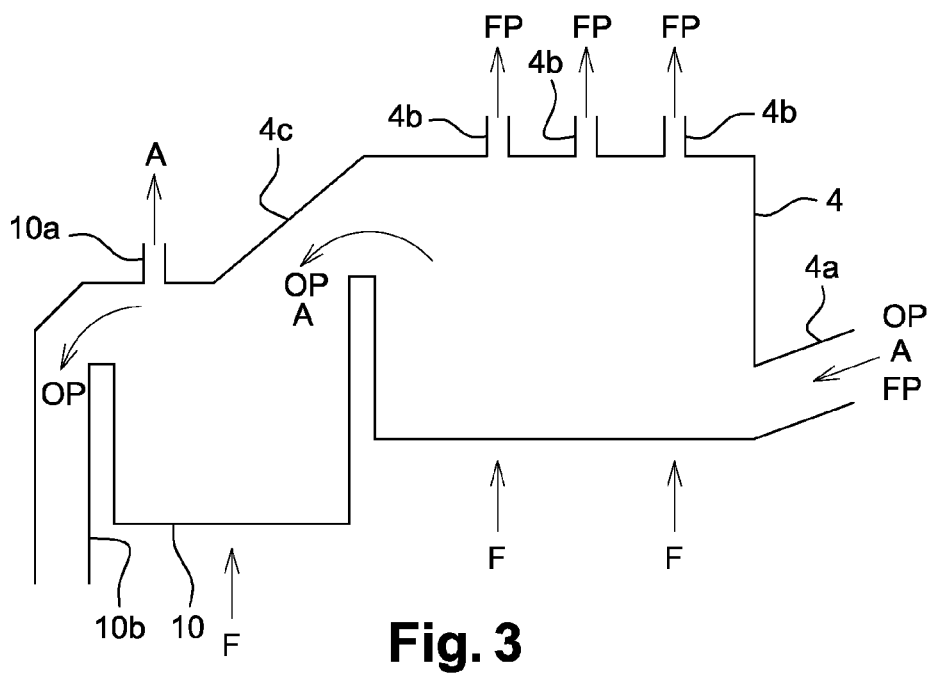

A detailed view of the association of the carbon separator 4 and the ash separator 10 is shown in FIGS. 2 and 3. FIGS. 2 and 3 schematically illustrate two embodiments of an assembly of a carbon separator and an ash separator used in the system for converting fuel material according to the invention.

The carbon separator 4 comprises an inlet 4a through which the fuel particles FP, the oxide particles OP and the ash A enter the carbon separator 4. The oxide particles OP are oxide particles that have been at least partially reduced in the fuel reactor. The carbon separator 4 is fluidized by fluidization means F. The fluidization means F can be steam and/or recycled flue gas and/or $CO_2$ inlets placed at the bottom of the carbon separator 4.

The fine and light fuel particles FP having a density of about 1.2 are directed toward the fuel reactor via outlets 4b of the carbon separator 4 while the denser and larger oxide particles OP and ash A are routed towards the ash separator 10.

The ash separator 10 is fluidized by fluidization means F. The fluidization means F can be steam and/or recycled flue gas and/or $CO_2$ inlets placed at the bottom of the carbon separator 4. The light ash A flows out the vent 10a towards a gas treatment system while the denser oxide particles OP passe through an outlet 10b of the ash separator 10 towards the air reactor.

The fluidizing velocity of the carbon separator 4 and of the ash separator 10 can be controlled in order to control the ash concentration in the system. The fluidizing velocity can be based on the respective density of ash A and oxide particles OP (about 2.5 and 4.5 respectively). Thus, the ash separator 10 can be fluidized at a velocity comprised between 0.3 and 0.8 m/s and the carbon separator 4 can be fluidized at a velocity comprised between 0.1 and 0.6 m/s.

According to a first embodiment, as shown in FIG. 2, the carbon separator 4 and the ash separator 10 are adjacent via a common side wall 13. The carbon separator 4 and the ash separator 10 are connected by an opening 4c of the side wall 13.

According to a second embodiment, as shown in FIG. 3, the carbon separator 4 and the ash separator 10 are connected by a pipe 4c. Moreover, the ash separator 10 can be placed below the carbon separator 4 in order to facilitate the passage of the oxide particles OP and the ash A from the carbon separator 4 to the ash separator 10.

What is claimed is:

1. A system for converting fuel material, said system comprising:
    a first reactor in which a fuel material reacts with an oxide particles for producing reaction products including fuel particles, ash and oxide particles,
    a second reactor in which the oxide particles produced in the first reactor are oxidized,
    a carbon separator that receives fuel particles, ash and oxide particles produced in the first reactor that separates the oxide particles and ash from the fuel particles, the carbon separator comprising a first outlet for the oxide particles and ash and a second outlet for the fuel particles;
    an ash separator that receives the oxide particles and ash from the first outlet of the carbon separator, the ash separator comprising a first outlet for the ash and a second outlet for the oxide particles.

2. The system according to claim 1, wherein the carbon separator and the ash separator are fluidized, and the system further comprises a controller to control the fluidization velocity of each separator.

3. The system according to claim 2, wherein the fluidization velocity of the ash separator is higher than the fluidization velocity of the carbon separator.

4. The system according to claim 3, wherein the carbon separator and the ash separator are adjacent via a common side wall.

5. The system according to claim 3, wherein the ash separator is placed below the carbon separator.

6. The system according to claim 1, wherein the carbon separator and the ash separator are adjacent via a common side wall.

7. The system according to claim 1, wherein the carbon separator and the ash separator are connected by a pipe.

8. The system according to claim 7, wherein the ash separator is placed below the carbon separator.

9. The system according to claim 1, further comprising:
a low efficiency cyclone separator connected to the first reactor, and
a high efficiency cyclone separator, wherein the low efficiency cyclone separator includes a lower outlet connected to the carbon separator and an upper outlet connected to the high efficiency cyclone separator.

10. The system according to claim 1, wherein the fuel material is coal.

11. The system according to claim 1, wherein the oxide material is metal oxide.

12. The system according to claim 1, wherein the fluidization velocity of the ash separator is higher than the fluidization velocity of the carbon separator.

13. The system according to claim 12, further comprising:
a low efficiency cyclone separator connect to the first reactor, and
a high efficiency cyclone separator, wherein the low efficiency cyclone separator includes a lower outlet connected to the carbon separator and an upper outlet connected to the high efficiency cyclone separator.

14. The system according to claim 1, wherein the fuel particles exiting the second outlet of the carbon separator are provided to the first reactor.

15. The system according to claim 14, wherein the oxide particles exiting the second outlet of the ash separator are provided to the second reactor.

16. The system according to claim 1, wherein the oxide particles exiting the second outlet of the ash separator are provided to the second reactor.

17. The system according to claim 1, wherein the second outlet of the carbon separator includes a plurality of second outlets.

18. The system according to claim 17, wherein the fuel particles exiting the plurality of second outlets of the carbon separator are provided to the first reactor.

* * * * *